United States Patent [19]

Le Pargneux

[11] 4,420,457

[45] Dec. 13, 1983

[54] FUEL ASSEMBLY

[75] Inventor: Jacques Le Pargneux, Lyon, France

[73] Assignee: Framatome, Courbevoie, France

[21] Appl. No.: 303,673

[22] Filed: Sep. 18, 1981

[30] Foreign Application Priority Data

Oct. 8, 1980 [FR] France .............................. 80 21499

[51] Int. Cl.³ .............................................. G21C 3/32
[52] U.S. Cl. ..................................... 376/446; 376/364
[58] Field of Search ............... 376/446, 438, 434, 442, 376/352, 364

[56] References Cited

U.S. PATENT DOCUMENTS 3,015,616  1/1962  Sturtz et al. ........................ 376/446
3,379,618  4/1968  Frisch ................................. 376/446
4,302,294  11/1981  Leclercq ............................ 376/446

Primary Examiner—Harvey E. Behrend

Attorney, Agent, or Firm—Pollock, Vande Sande & Priddy

[57] ABSTRACT

The object of the invention is a nuclear reactor fuel assembly including fuel elements arranged in a supporting frame comprising two endpieces, the upper (1) and the lower (2) respectively, to which are attached the ends of a plurality of vertical tubes (3), each endpiece 1(2) including a plane base 11(21) in which are arranged two series of orifices 7 for retaining the tubes (3) and for the flow of the cooling fluid.

In accordance with the invention the base (11,21) of each endpiece (1,2) is joined side by side with an inner plate (15,25) equipped with the same series of orifices (70) for retaining the tubes (3) and for the flow of the fluid, and the orifices (70) have an oblong cross-section and are equipped with parts for attachment which cooperate with corresponding parts (31) for attachment of the said tubes (3) by transverse displacement of the inner plate.

5 Claims, 10 Drawing Figures

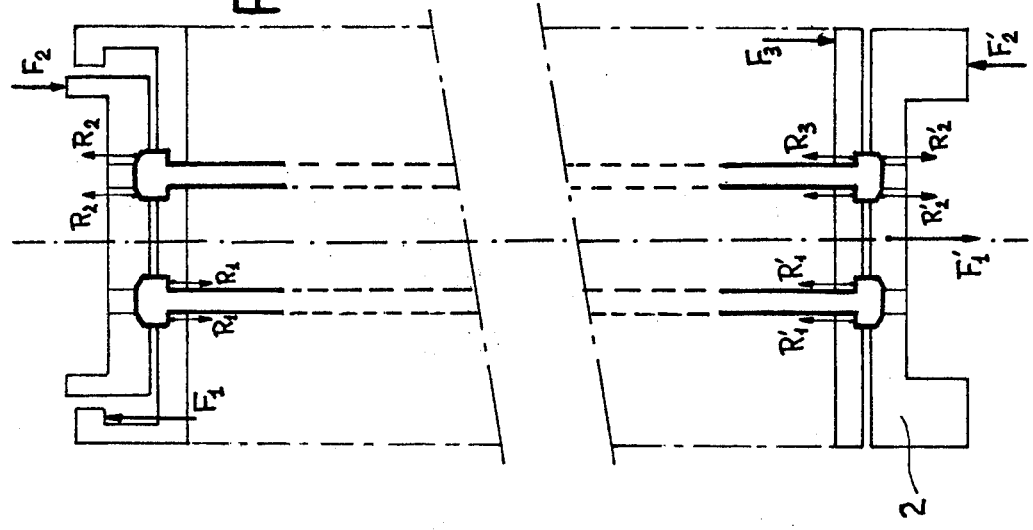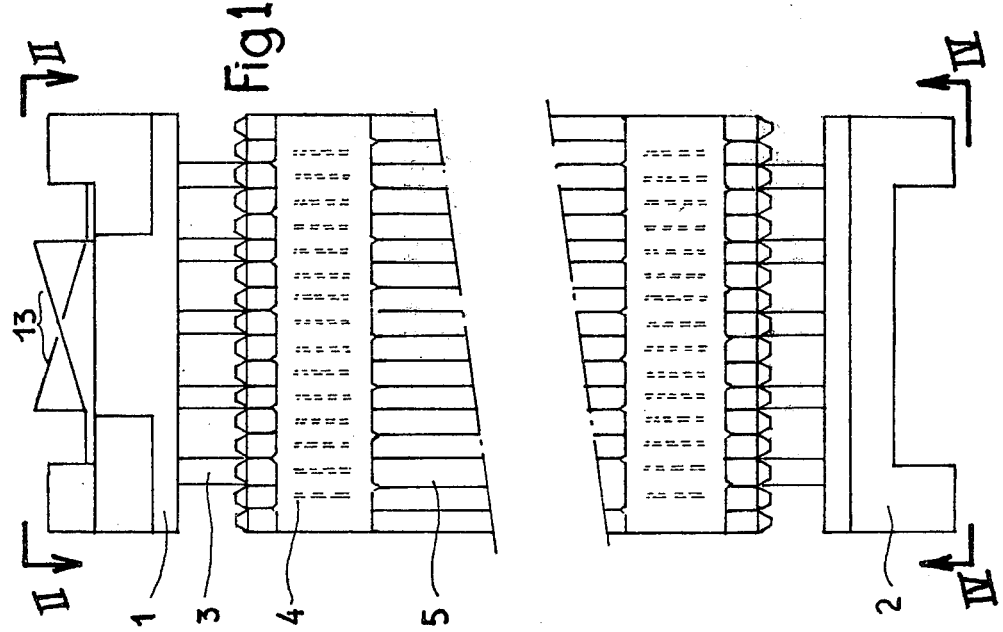

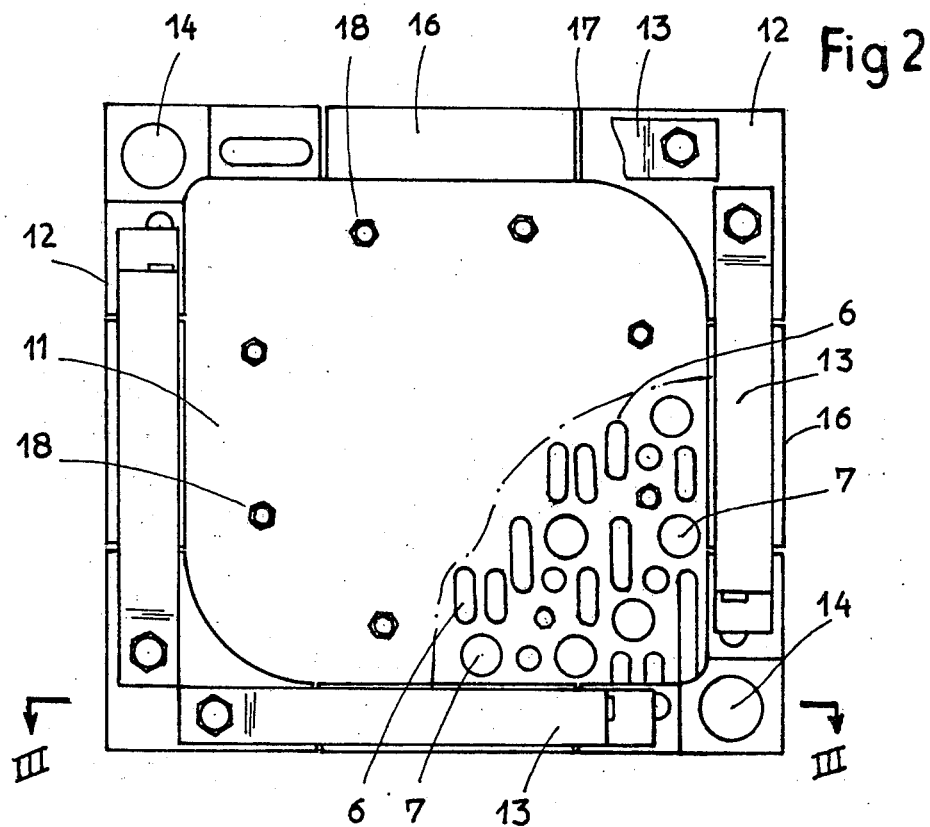
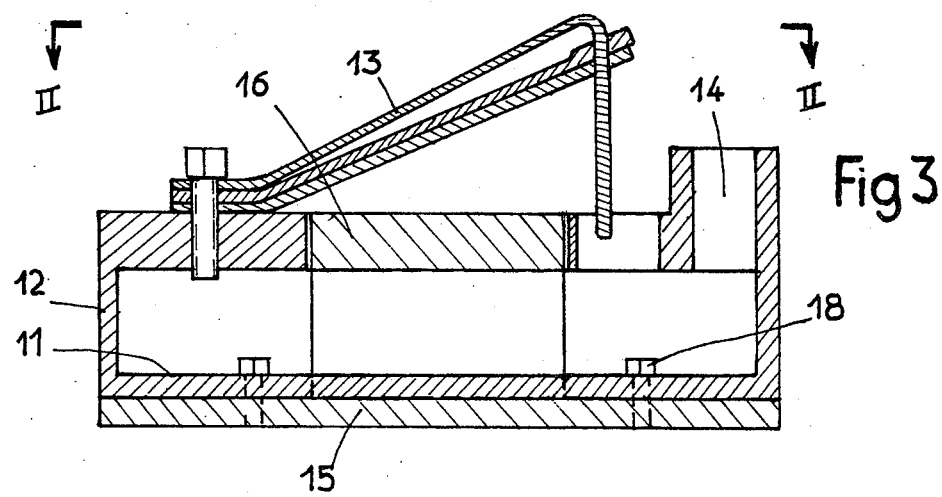

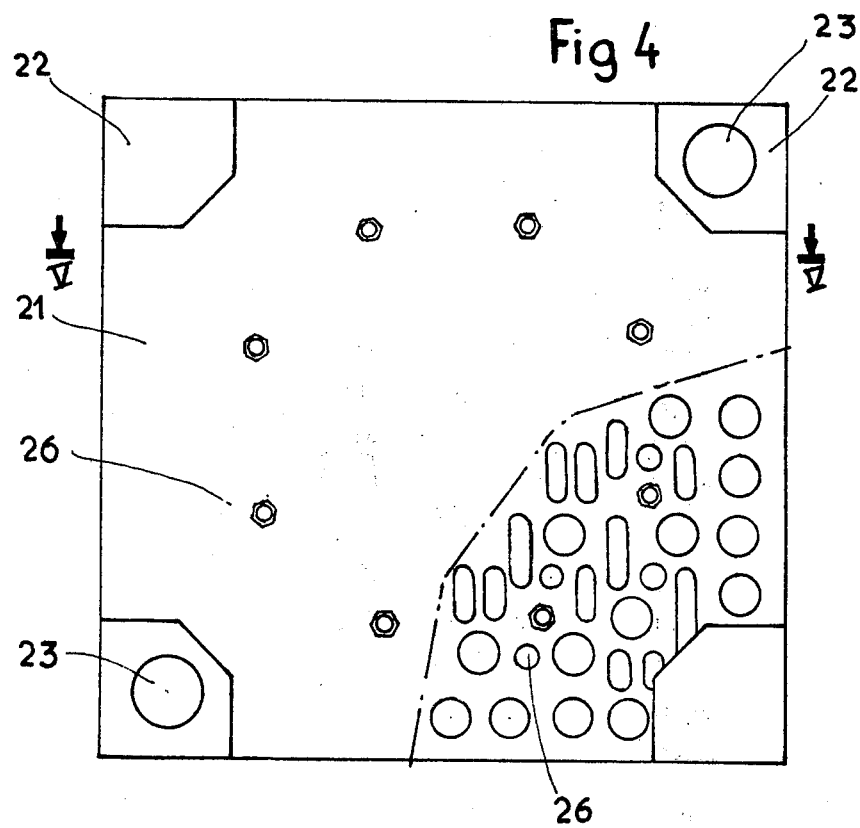
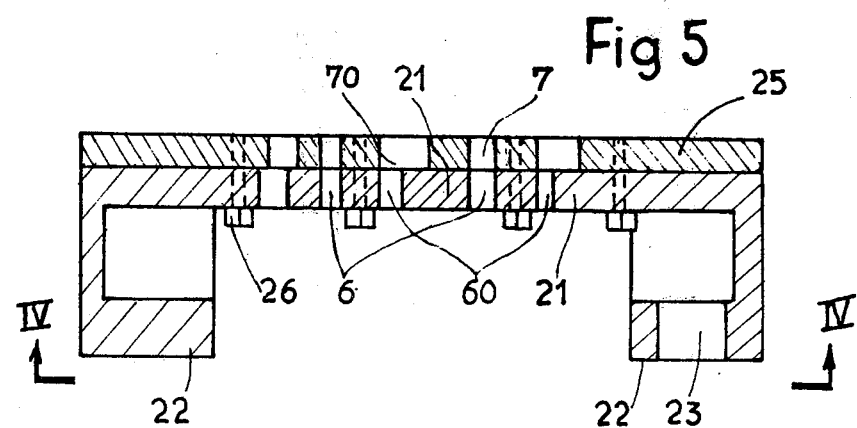

FUEL ASSEMBLY

FIELD OF THE INVENTION

The object of the invention is a fuel assembly for a nuclear reactor and in particular for a pressurized-water reactor.

BACKGROUND

In nuclear reactors the fuel elements are generally arranged in the form of assemblies which may be withdrawn individually in order to be placed in a deactivation pool.

Each assembly consists of a plurality of elements called pencils which are arranged vertically in a supporting frame. The frame consists of two endpieces called the upper tubeplate and lower tubeplate to which are attached the ends of a plurality of vertical tubes which substitute certain pencils. The tubes serve, for example, for the guidance of control bars. Between the upper and lower tubeplates are arranged a number of bracer grids which bear against the tubes and which are equipped with members for retaining the fuel elements.

Each endpiece comprises a plane base in which are arranged two series of orifices. The ends of the tubes are engaged and fixed into the orifices of the first series, whereas the second series serves for the flow of cooling fluid between the fuel elements.

The lower endpiece bears against the lower internal fittings. The latter are bounded by the lower plate of the core which is equipped with dowels for centreing which engage in orifices arranged in four feet placed at the corners of the lower endpiece.

Similarly the upper endpiece is likewise equipped at its corners with orifices in which engage dowels for centreing which are integral with the upper plate of the core, which bounds the upper internal fittings.

Periodically it is necessary to proceed with recharging with fuel. For this purpose the upper internal fittings are removed in order to gain access to the whole of the fuel assemblies. Each assembly may be withdrawn as a unit and placed in a cell in a deactivation pool. In this pool a remote-controlled machine proceeds with dismantling of the fuel assembly. That is, it is necessary to be able to gain access to the pencils in order to change or eliminate certain of them which are recognised as defective or able to be recycled.

Similarly the ability for dismantling enables re-use of the pieces of the skeleton and in parallel more compact storage of the pencils withdrawn from the skeleton.

PRIOR ART

Various arrangements have already been proposed to enable the endpieces of the assembly to be dismounted and remounted in a practical manner so as to have easy access to the pencils. This operation which must be effected under water since the assemblies have been irradiated, must also be as simple as possible. In the various known solutions, however, it is generally necessary to mount or to dismount small pieces by grasping them gently and this operation when remote-controlled demands much time and accuracy. The object of the invention is a new arrangement of the fuel assembly which enables the operations of mounting and dismounting to be carried out easily whilst keeping an effective mechanical hold of the endpieces.

SUMMARY OF THE INVENTION

In accordance with the invention the base of each endpiece is associated with an inner plate equipped with the same series of orifices for passing through the tubes and for the flow of fluid, the said inner plate being joined side by side with the said base and connected to it by detachable means of attachment so as to form a whole having the mechanical characteristics demanded of the base and the orifices for passing through the tubes, arranged in the inner plate, have an oblong shape and are equipped with parts for attachment, which cooperate with corresponding parts arranged on the end of each tube for the attachment of the said tubes by transverse displacement of the inner plate, the whole being locked by attachment of the base to the inner plate after the putting of the latter in place.

BRIEF DESCRIPTION OF THE DRAWINGS

The invention will now be described by referring to a particular embodiment given by way of example and represented in the attached drawings.

FIG. 1 is a general elevation of a fuel assembly.

FIG. 2 is a plan of the upper endpiece in the direction II—II as in FIG. 1.

FIG. 3 is a cross-section along III—III in FIG. 2.

FIG. 4 is a view from below the lower endpiece in the direction IV—IV as in FIG. 1.

FIG. 5 is a cross-section along V—V in FIG. 4.

FIG. 10 is a schematic elevation of a cylindrical furnace, illustrating the distribution of forces by means of arrows.

DETAILED DESCRIPTION OF AN EMBODIMENT

Figure 6:
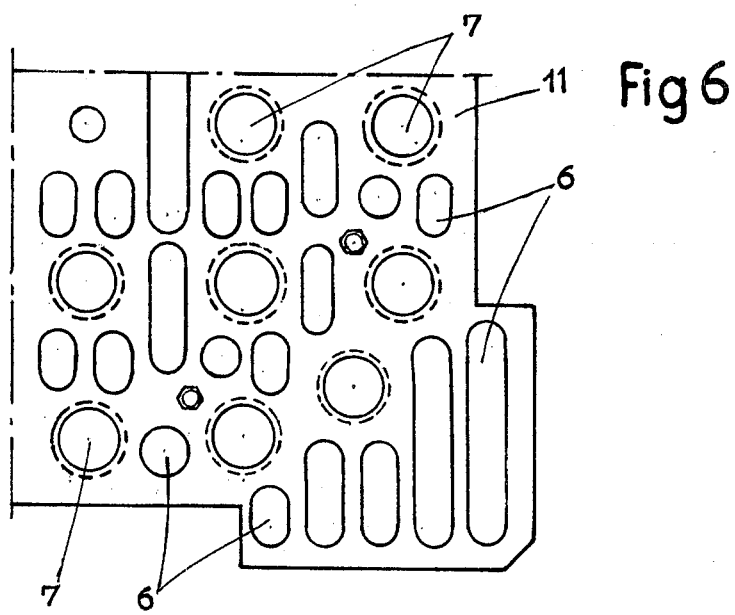
FIGS. 6 and 7 are partial plan views of the base of the upper endpiece and of the corresponding inner plate respectively.

In FIG. 1 there is represented in perspective the whole of a fuel assembly which comprises a frame forming a supporting skeleton consisting of an upper endpiece 1 and a lower endpiece 2 connected together by a plurality of tubes 3.

Between the two endpieces are distributed a number of bracer grids 4 which bear against the tubes 3 and which serve for retaining the fuel pencils 5.

In FIGS. 2 and 3 there is shown the upper endpiece 1 which in a conventional manner comprises a plane base 11 integral with a square frame 12. On to the sides of the frame are attached retainer springs 13 and at two diagonally opposite corners are arranged seatings having vertical axes 14 in which there will be placed the dowels for centreing the upper plate of the core.

In accordance with one essential characteristic of the invention the base 11 is associated with an inner plate 15 to which are attached preferably feet 16 which serve for slinging the whole and which pass into hollows 17 arranged in the base 11.

Otherwise the base 11 and the plate 15 are attached by screws 18.

The base 11 and the plate 15 are equipped otherwise with orifices 6 and 60 respectively, for the flow of cooling fluid and orifices 7 and 70 for attachment of the ends of the tubes. In FIG. 2 only a few of these orifices have been shown.

The lower endpiece 2 represented in FIGS. 4 and 5 is composed similarly of a base 21 at the four corners of which are placed feet 22 for bearing against the lower plate of the core. Two of these feet 22 diagonally opposite are equipped with seatings 23 in which dowels for centreing, integral with the lower plate of the core, may be engaged.

As indicated above for the upper endpiece the base 21 is associated with an inner plate 25 and they are equipped respectively with the same series of orifices 6 (60) for the flow of the fluid and 7 (70) for attachment of the ends of the tubes. Otherwise the base 21 and the plate 25 are connected detachably by fixing screws 26.

Figure 7:
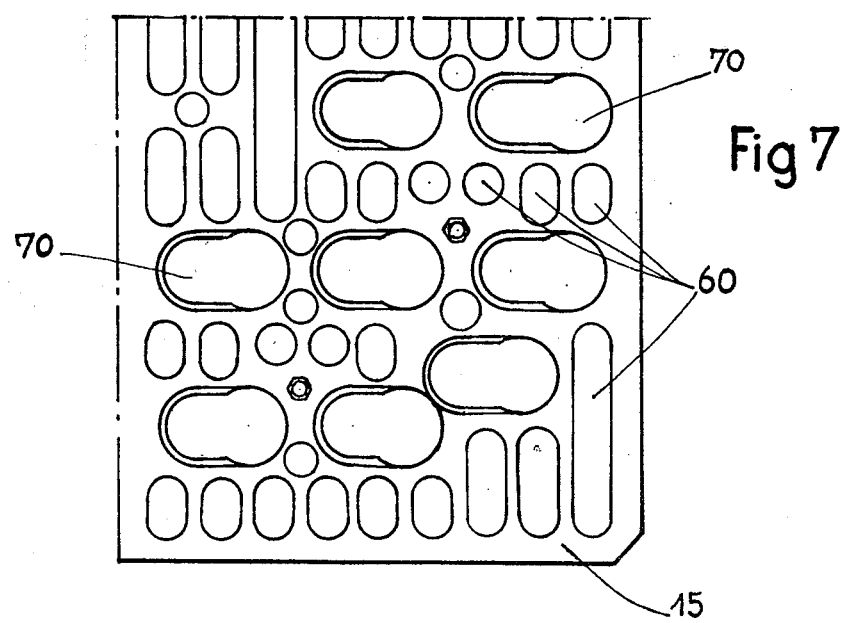

In FIGS. 6 and 7 there has been shown respectively a portion of the base 11 and of the inner plate 15 in plan in order to show the two series of orifices 6 (60) for the flow of the cooling fluid and 7 (70) corresponding with the guide tubes.

The orifices 6 and 60 have dimensions chosen in order to define a total area of flow of the fluid as large as possible whilst preserving indispensable mechanical strength characteristics.

The orifices 7 arranged in the base 11 have a circular cross-section which corresponds with the cross-section of the tubes. On the other hand the corresponding orifices 70 in the inner plate 15 have an oblong shape so as to enable bayonet attachment of the ends of the tubes as will be seen by referring to FIGS. 8 and 9.

For that purpose, each tube 3 is equipped at its end with a ring 31 and the corresponding orifice 70 in the inner plate 15 is formed by the meeting of two portions, a cylindrical portion 71 of diameter d1 equal to the outer diameter of the ring 31, and a semi-cylindrical portion 72 offset to the side, of diameter d2 equal to the outer diameter of the tube 3 and connected to the portion 71 by two parallel walls 73 separated by a distance equal to the said diameter d2 of the tube 3.

However, on the face of the plate 15 next to the base 11 there is arranged a facing or a neck 74 of width equal to the diameter d1 of the ring 31.

In that way, when the plate 15 is placed over the ends of the tubes, the tubes may be threaded into the portions 71 of the orifices 70 until the rings 31 reach above the facings 74. Then the blade 15 can be displaced sideways, each tube 3 then coming and placing itself on the axis of the portion 72 and its ring 31 being engaged in the corresponding facing 74.

The tubes 3 being thus all wedged at the same time into the bottom of the orifices 72 by the sideways displacement of the plate 15, the endpiece 1 is put into place, the base 11 of which comes and fits against the inner plate 15.

Preferably the ring 31 of each tube 3 has a height h1 greater than the depth h2 of the facing 74 and the upper portion of each ring passing beyond the level of the plate 15 has a frustoconical cross-section and may be engaged in an enlargement 75 of the same cross-section arranged at the periphery of each corresponding orifice 7. Each tube is thus locked axially and radially when the plate 15 has been attached to the base 11 by means of the screws 18.

The attachment of the tubes on to the lower endpiece 2 may be effected in a quite similar fashion.

Figure 8:
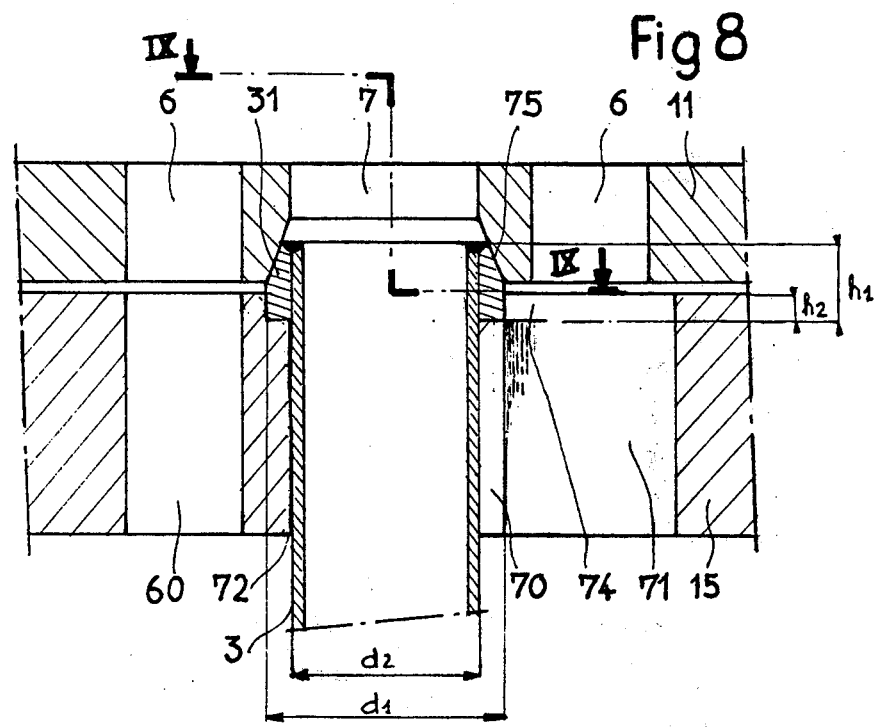
FIG. 8 is a detail in axial section of the attachment of the upper end of a tube on to the endpiece.
Figure 9:
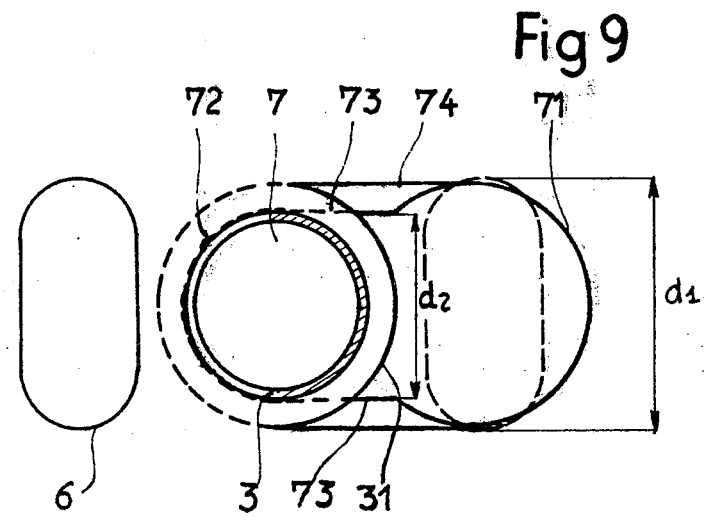
FIG. 9 is a view in the direction IX—IX of the portion represented in FIG. 8.

On the other hand, as may be seen in FIG. 8, when the tubes 3 are in place, the portion 71 of the orifices 70 may serve for the flow of the fluid in the zones where they coincide with orifices 6 in the plate 11.

The screws 18 and 26 have the role of avoiding relative sliding of the inner plate and the base but do not undergo tensile forces because as shown in FIG. 10, all of the forces parallel with the axis of the assembly are directly transmitted by the guide tubes 3 and distributed over the zones which provide the reaction without any force upon the connecting screws 18(26). Thus in maintenance the fuel assembly is suspended by the portions 16 integral with the plate 15. In this case the tubes 3 are hooked on to the plate 15 by the rings 31 which bear against the facings 74 and they themselves support the whole weight of the assembly. Similarly the attachment on to the lower endpiece being reversed, in maintenance the rings 31 on the tubes 3 support the inner plate 25 to which the base 21 is attached by the screws 26. Hence the latter support only the weight of the lower endpiece 2.

When the assembly is under upper or lower load, the ends of the tubes 3 bear against the base 11 or at the lower part against the base 21 by way of the rings 31 engaged in the portions 75 of the orifices 7. In that way the axial bearing forces are transmitted directly by the rings 31 and distributed over the bases 11 and 21 which provide the reaction.

This is illustrated by FIG. 10 which represents cylindrical furnaces, in maintenance in the left hand part of it and under load in the right hand part.

The forces of suspension F1 applied in maintenance to the slinging portions 16 correspond with the reactions R1 from the rings 31 distributed over the upper plate 15 and R'1 distributed over the lower plate 25 which supports the weight F'1 of the lower tubeplate 2.

Conversely, the force F2 from the upper plate of the core bearing against the upper tubeplate 1 corresponds with reactions R2 and R'2 from the tubes respectively against the bases 11 of the upper tubeplate 1 and 21 of the lower tubeplate 2 against which is exerted the reaction F'2 from the ground or from the lower plate of the core.

Similarly an accidental force F3 due, for example, to a shock against the lower tubeplate 2 is absorbed by the tubes 3 by way of the lower rings which withstand a corresponding reaction R3.

Of course the invention is not restricted to the details of the embodiment which has been described but on the contrary it embraces any variants which might differ from it only by the use of equivalent means.

Thus the ring 31 for attachment of the tube 3 may be either connected on to the tube by welding or crimping or formed directly by toroidal or conical expansion.

I claim:

1. A fuel assembly for a nuclear reactor, including a plurality of fuel elements arranged vertically in a supporting frame including two endpieces, the upper 1 and lower 2 respectively, to which are attached the ends of a plurality of vertical tubes 3 along which are arranged a plurality of grids 4 for retaining the fuel elements 5, each endpiece 1(2) comprising a plane base 11 (21) upon which are arranged a first series of orifices 7 in which the ends of the tubes 3 are engaged and fixed and a second series of orifices 6 for the flow of fluid for cooling the fuel elements 5, characterized by the fact that the base 11 (21) of each endpiece 1 (2) is associated with an inner plate 15 (25) equipped with the same series of orifices 70 for engagement of the tubes 3 and 60 for the flow of fluid, the said inner plate 15 (25) being joined side by side with the said base 1 (2) and connected to it by detachable means 18 (26) of attachment so as to form a whole having the mechanical characteristics demanded of the base 1 (2), and by the fact that the orifices 70 for engagement of the tubes 3, arranged in the inner plate 18 (25), have an oblong cross-section and are equipment with parts 74 for attachment, which cooperate with corresponding parts 31 arranged on the end of each tube 3 for the attachment of these tubes by transverse displacement of the inner plate, the whole being then locked by attachment of the base to the inner plate.

2. A fuel assembly as in claim 1, characterized by the fact that each tube 3 is equipped at each end with a portion 31 of enlarged cross-section and that each corresponding oblong orifice 70 in the inner plate 15 (25) is formed by the meeting of two offset portions, the one 71 of width d1 equal to that of the enlarged portion 31 of the tube 3 and the other 72 of width d2 equal to that of the tube 3, the inner wall of this second portion being equipped with a neck 74 in which the enlarged portion 31 of the tube may be engaged by sideways displacement of the inner plate 15 (25) with respect to the tube 3, the said enlarged portion 31 of the tube 3 and the said neck 74 forming the parts for attachment of the tube 3 to the plate 15 (25).

3. A fuel assembly as in claim 2, characterized by the fact that the neck 74 in which the enlarged portion 31 of each tube 3 may be engaged consists of a facing arranged on the face of the plate 15 (25) next to the base 1 (2) and that the enlarged portion 31 has a height h1 greater than the depth h2 of the said facing 74 and is engaged in an enlargement of corresponding cross-section arranged at the periphery of the corresponding orifice 7 in the base 1 (2) at the time of putting the latter in place.

4. A fuel assembly as in claim 3, characterized by the fact that under load the axial forces are transmitted directly by the enlarged portions 31 of the tubes 3 and distributed over the bases 11 and 21 which provide the reaction.

5. A fuel assembly as in claim 3, characterized by the fact that in maintenance the axial forces of suspension are transmitted directly by the enlarged portions 31 of the tubes 3 and distributed over the inner plates 15 and 25 which provide the reaction, the upper plate 11 being equipped with means 16 of slinging the whole of the assembly.

* * * * *